(12) United States Patent
Sundaram (10) Patent No.: US 10,500,538 B2
(45) Date of Patent: Dec. 10, 2019

(54) FAST CYCLE GAS PHASE SIMULATED MOVING BED APPARATUS AND PROCESS

(71) Applicant: ExxonMobil Research and Engineering Company, Annandale, NJ (US)

(72) Inventor: Narasimhan Sundaram, Annandale, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 166 days.

(21) Appl. No.: 15/877,419

(22) Filed: Jan. 23, 2018

(65) Prior Publication Data

US 2018/0229177 A1    Aug. 16, 2018

Related U.S. Application Data

(60) Provisional application No. 62/459,171, filed on Feb. 15, 2017.

(51) Int. Cl.
*B01D 53/047*    (2006.01)
*B01D 53/08*    (2006.01)
(Continued)

(52) U.S. Cl.
CPC ....... *B01D 53/047* (2013.01); *B01D 53/0446* (2013.01); *B01D 53/0462* (2013.01);
(Continued)

(58) Field of Classification Search
CPC .. B01D 53/047; B01D 53/04; B01D 53/0446; B01D 53/0462; B01D 53/0473; B01D 53/08; B01D 2253/102; B01D 2253/108; B01D 2253/204; B01D 2256/10; B01D 2256/15; B01D 2256/22; B01D 2256/24; B01D 2257/108; B01D 2257/504; B01D 2257/7022; B01D 2257/7025; B01D 2257/7027; B01D 2259/40005; B01D 2259/402; B01D 2259/403; B01D 2259/404; B01D 2259/41; B01D 2259/4566; B01J 20/165; B01J 20/226; C01B 21/045; C01B 3/56;
(Continued)

(56) References Cited

U.S. PATENT DOCUMENTS 2,706,532 A *  4/1955  Ringo ................ B01D 53/0423
                                                    137/625.15
3,757,492 A *  9/1973  Graff .................. B01D 53/0431
                                                    96/123
(Continued)

FOREIGN PATENT DOCUMENTS

EP        0853967 A2    7/1998

OTHER PUBLICATIONS

The International Search Report and Written Opinion of PCT/US2018/014796 dated May 3, 2018.
(Continued)

*Primary Examiner* — Frank M Lawrence, Jr.
(74) *Attorney, Agent, or Firm* — Priya G. Prasad; Andrew T. Ward (57) ABSTRACT

Systems and processes for use of concentric adsorbent beds with rotary valve assemblies are provided.

24 Claims, 5 Drawing Sheets

(51) Int. Cl.
*B01D 53/04* (2006.01)
*C01B 21/04* (2006.01)
*F17C 11/00* (2006.01)
*B01J 20/22* (2006.01)
*B01J 20/16* (2006.01)
*C01B 3/56* (2006.01)

(52) U.S. Cl.
CPC ......... *B01D 53/0473* (2013.01); *B01D 53/08* (2013.01); *C01B 21/045* (2013.01); *F17C 11/00* (2013.01); *B01D 2253/102* (2013.01); *B01D 2253/108* (2013.01); *B01D 2253/204* (2013.01); *B01D 2256/10* (2013.01); *B01D 2256/16* (2013.01); *B01D 2256/22* (2013.01); *B01D 2256/24* (2013.01); *B01D 2257/108* (2013.01); *B01D 2257/504* (2013.01); *B01D 2257/7022* (2013.01); *B01D 2257/7025* (2013.01); *B01D 2257/7027* (2013.01); *B01D 2259/402* (2013.01); *B01D 2259/403* (2013.01); *B01D 2259/404* (2013.01); *B01D 2259/40005* (2013.01); *B01D 2259/41* (2013.01); *B01D 2259/4566* (2013.01); *B01J 20/165* (2013.01); *B01J 20/226* (2013.01); *C01B 3/56* (2013.01); *C01B 2203/043* (2013.01); *C01B 2203/0475* (2013.01); *Y02C 10/08* (2013.01); *Y02C 20/20* (2013.01); *Y02P 20/152* (2015.11); *Y02P 20/156* (2015.11)

(58) Field of Classification Search
CPC ....... C01B 2203/043; C01B 2203/0475; F17C 11/00; Y02C 10/08; Y02C 20/20; Y02P 20/152; Y02P 20/156

USPC ........ 96/121, 124; 95/96–98, 130, 139, 143, 95/144; 206/0.7

See application file for complete search history.

(56) References Cited

U.S. PATENT DOCUMENTS

| | | | | |
|---|---|---|---|---|
| 4,698,072 | A | * 10/1987 | Rohde | B01D 53/0423 95/119 |
| 5,827,358 | A | * 10/1998 | Kulish | B01D 53/0407 96/115 |
| 6,311,719 | B1 | 11/2001 | Hill et al. | |
| 7,819,948 | B2 | 10/2010 | Wagner | |
| 9,120,049 | B2 | 9/2015 | Sundaram et al. | |
| 9,162,175 | B2 | 10/2015 | Sundaram | |
| 2008/0282886 | A1 | 11/2008 | Reyes et al. | |
| 2008/0282892 | A1 | 11/2008 | Deckman et al. | |
| 2009/0229555 | A1 | 9/2009 | Ginzburg et al. | |
| 2009/0314159 | A1* | 12/2009 | Haggerty | B01D 53/02 95/90 |
| 2010/0059701 | A1 | 3/2010 | McLean | |
| 2010/0089241 | A1 | 4/2010 | Stoner et al. | |
| 2011/0067770 | A1* | 3/2011 | Pederson | F16K 11/074 137/625.15 |
| 2013/0333571 | A1 | 12/2013 | Sundaram et al. | |
| 2013/0340620 | A1 | 12/2013 | Sundaram | |

OTHER PUBLICATIONS

Ritter et al., "Tapered Pressure Swing Adsorption Columns for Simultaneous Air Purification and Solvent Vapor Recovery", 37 Industrial & Engineering Chemistry Research, Jun. 16, 1998, pp. 2783-2791, vol. 37(7), ACS Publications.

* cited by examiner

FAST CYCLE GAS PHASE SIMULATED MOVING BED APPARATUS AND PROCESS

CROSS-REFERENCE TO RELATED APPLICATIONS

This application claims the benefit of U.S. Provisional Application No. 62/459,171, filed on Feb. 15, 2017, the entire contents of which are incorporated herein by reference.

FIELD

The present application provides adsorption systems and processes having a plurality of concentric adsorption beds within a single vessel and rotary valve assemblies at either end of the vessel for use in swing adsorption techniques.

BACKGROUND

Gas separation is important in many industries and can typically be accomplished by flowing a mixture of gases over an adsorbent that preferentially adsorbs one or more gas components while not adsorbing one or more other gas components. The non-adsorbed components are then recovered as a separate product.

An important type of gas separation technology is swing adsorption, such as temperature swing adsorption (TSA) or pressure swing adsorption (PSA). PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide is selectively adsorbed by the adsorbent, and the gas exiting the vessel is enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

U.S. Pat. No. 9,120,049, which is incorporated herein by reference, describes a rotary valve arrangement for a cyclical swing adsorption process using a single fixed bed, the single bed being sandwiched between a pair of rotors and a pair of stators. The fixed plate stators communicate with the adsorbent bed when an aperture in the associated rotor aligns with the corresponding aperture in the stator.

U.S. Pat. No. 9,162,175, which is incorporated herein by reference, describes a plurality of concentric adsorbent beds within a single vessel, each adsorbent bed having an equal face cross-sectional area.

U.S. Provisional Application No. 62/370,881, which is incorporated herein by reference, describes a tapered adsorbent bed wherein the cross-sectional area of the bed tapers in the direction of feed flow. It has been reported that tapered adsorbent beds can improve product purity in PSA cycling applications. See James A. Ritter et al., *Tapered Pressure Swing Adsorption Columns for Simultaneous Air Purification and Solvent Vapor Recovery*, 37 IND. ENG. CHEM. RES. 2783-91 (1998). Ritter reports, among other things, that in an adiabatic bed in PSA cycling, product purity is several orders of magnitude higher in a tapered bed compared to a non-tapered bed. Ritter, at 2787, FIG. 5. This improvement in purity is of particular significance to hydrogen production where very high purities, e.g. 99.9% purity or greater are required. Moreover, Ritter describes another advantage of tapered versus conventional adsorbent beds with respect to temperature profile across the bed. Ritter, at 2787, FIG. 6. For tapered beds, the temperature profile at the end of the feed or adsorption step is substantially lower in the mass transfer zone. This lower temperature maintains a higher $CO_2$ adsorption as well as a higher water gas shift conversion in the case of a syngas feedstream. Tapered adsorbent beds, however, are irregularly shaped and cannot be easily incorporated into a tight refinery environment, where space is at a premium.

There remains a need in the industry for apparatus, methods, and systems are more efficient and that can be constructed and employed on a smaller footprint than conventional equipment. Compact designs are critical when the swing adsorption apparatus is to be deployed in remote locations, such as off-shore production platforms, arctic environments, or desert environments.

SUMMARY

Systems and processes for compact adsorption and desorption of a target gas are provided. In one aspect, an adsorbent bed system for use in swing adsorption processes is provided comprising: a rotary valve assembly comprising a feed stator having at least two annular tracks, each of the annular tracks having at least one opening to permit gas to flow there through; a feed rotor being connected to the feed stator, the feed rotor having at least two annular tracks, each of the annular tracks having an opening to permit gas to flow there through; product rotor having at least two annular tracks, each of the annular tracks having an opening to permit gas to flow there through; and a product stator having at least two annular tracks, each of the annular tracks having an opening to permit gas to flow there through; a first adsorbent bed of material capable of selectively removing a target gas from a gaseous mixture, which adsorbent bed is substantially cylindrical shape; and a second adsorbent bed of material capable of selectively removing a target gas from a gaseous mixture, which second adsorbent bed has a substantially cylindrical shape and being disposed about the first adsorbent bed of material and has a different face cross-sectional area than the face cross-sectional area of the first adsorbent bed; the first and second adsorbent beds being in fluid communication with the feed rotor, product rotor, and each other.

In some aspects, the adsorbent bed system described above may include a third and fourth adsorbent bed(s) of material capable of selectively removing a target gas from a gaseous mixture and being substantially annular in shape and being disposed about the second (or third) adsorbent bed, the third (or fourth) adsorbent bed having a different face cross-sectional area than the face cross-sectional area of the first and second adsorbent beds; wherein the feed stator and feed rotor have at least three annular tracks, each of the annular tracks having an opening to permit gas flow through; and wherein the product rotor and product stator have at least three annular tracks, each of the annular tracks having an opening to permit gas flow through.

Materials capable of selectively removing a target gas are carbons, zeolites, metal-organic frameworks, or combinations thereof. Various flow paths may exist through and between the beds. In one aspect, the gaseous mixture flows through the feed stator, through the feed rotor, into the first adsorbent bed, then into the second adsorbent bed, then into the third adsorbent bed, through the product rotor, and through the product stator, wherein flow through the first, second, and third adsorbent bed is in the axial plane, wherein flow through the second adsorbent bed is in the opposite direction from the first adsorbent bed and the third adsorbent bed, wherein the face cross-sectional area of the first adsorbent bed is greater than the second adsorbent bed, wherein the face cross-sectional area of the second adsorbent bed is greater than the third adsorbent bed. In another aspect, the gaseous mixture flows through the feed stator, through the feed rotor, into the third adsorbent bed, then into the second adsorbent bed, then into the first adsorbent bed, through the product rotor, and through the product stator, wherein flow through the first, second, and third adsorbent bed is in the axial plane, wherein flow through the second adsorbent bed is in the opposite direction from the first adsorbent bed and the third adsorbent bed, wherein the face cross-sectional area of the third adsorbent bed is greater than the second adsorbent bed, wherein the face cross-sectional area of the second adsorbent bed is greater than the first adsorbent bed.

In another aspect, the feed stator includes three rings of annular tracks, each ring aligned with one of the first, second, and third adsorbent bed, each ring containing annular tracks for a feedstream, a blowdown stream, a purge stream, and pressure equalization with a neighboring adsorbent bed.

The volume of adsorbent within the beds can be different or the same. It can be loaded to different heights or the same height. Additionally, the adsorbent beds can be offset from one another so as to build in space of interconnections between the beds such as piping and valving.

Adsorption processes using the systems described above are also provided. In one aspect, an adsorption process is provided comprising: providing a feedstream containing a first concentration of a product gas and first concentration of a target gas; feeding the feedstream to the first adsorbent bed in the adsorption system described above; in the first adsorbent bed, adsorbing the target gas onto the material capable of selectively removing a target gas from a gaseous mixture; recovering a stream from the first adsorbent bed that has a higher concentration of product gas and a lower concentration of target gas than the feedstream; reducing the pressure in the first adsorbent bed by equalizing the first adsorbent bed with one of the second and third adsorbent beds; further reducing the pressure in the first adsorbent bed by outputting a blowdown stream from at least one end of the first adsorbent bed; purging the first adsorbent bed with a purge gas to produce a target gas recovery stream that as higher concentration of target gas and a lower concentration of product gas than the feedstream.

In another aspect, during feeding of the first adsorbent bed, the second adsorbent bed equalizes with the third adsorbent bed and undergoes a repressurization step and the third adsorbent bed equalizes with the second adsorbent bed and undergoes a blowdown step and a purge step. In yet another aspect, the feedstream passes sequentially from the first adsorbent bed to the second adsorbent bed to the third adsorbent bed, wherein the first adsorbent bed has a greater face cross-sectional area than the second adsorbent bed, wherein the second adsorbent bed has a greater cross-sectional area than the third adsorbent bed.

Example product gases are nitrogen and hydrogen. Example target gases include carbon dioxide or methane. In certain aspects, the feedstream may include nitrogen and oxygen, such as a feedstream of air. The feedstream may also include olefins, such as ethylene and propylene, and paraffins, such as ethane and propane. The feedstream could also comprise a mixture of xylenes.

In still another aspect, an adsorption process of storage and use of a target gas is provided, comprising: providing a feedstream consisting essentially of a target gas; feeding the feedstream to the first adsorbent bed in the adsorption system of claim 1; adsorbing the target gas onto the material capable of selectively removing a target gas in the first adsorbent bed; discharging target gas previously adsorbed onto the material capable of selectively removing a target gas in the second adsorbent bed by depressurizing the second adsorbent bed; wherein a portion of the discharged target gas is fed into the first adsorbent concurrently with the feeding the feedstream to the first adsorbent bed; feeding the feedstream to the second adsorbent bed in the adsorption system described above; adsorbing the target gas onto the material capable of selectively removing a target gas in the second adsorbent bed; discharging target gas previously adsorbed onto the material capable of selectively removing a target gas in the first adsorbent bed by depressurizing the second adsorbent bed; wherein a portion of the discharged target gas is fed into the second adsorbent concurrently with the feeding the feedstream to the second adsorbent bed; and directing a portion of discharged target gas to a power generation assembly.

In certain aspect, the above storage process may take place on-board a vehicle and the power generation assembly provides propulsion power to the vehicle. Because the process of adsorption is exothermic, in certain aspects, the process may further include cooling the first adsorbent bed via depressurization of the second adsorbent bed and cooling the second adsorbent via depressurization of the first adsorbent bed. In certain cases, the target gas will be methane.

DETAILED DESCRIPTION

Definitions

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting The present invention relates to rotary gas separation devices, particularly to rotary pressure swing adsorption devices. Rotary pressure swing devices can include, for example, a rotor with a plurality of adsorbent beds, a stator with a plurality of conduits, and a rotary valve comprising a seal assembly positioned between the rotor and the stator.

The rotary valve apparatus of the present invention can be used for any type of swing adsorption process. Non-limiting swing adsorption processes for which the present invention can be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

Conventional swing adsorption processes typically take place in a cylindrical vessel containing a plurality of adsorbent beds, each undergoing a different step in an adsorption cycle that usually includes an adsorption step, one or more depressurization/desorption steps, one or more blow-down steps, and one or more repressurization steps. The flow of fluid to and from each bed is controlled by use of either a poppet valve or a rotary valve assembly.

Rotary valves are well known in the art and provide an efficient way of consolidating the multiple valves required for repetitive chemical processing cycles in a single vessel. Rotary valves can be particularly useful in chemical processing operations involving pressure swing apparatuses. In general, rotary valves are comprised of a stator and a rotor that is rotational about its axis relative to the stator. Both stator and rotor contain suitable sized location ports that function as multiple valves as a result of the rotation of the rotor. Via this rotation, the ports in the rotor come into and out of alignment with the ports of the stator, thus opening and closing the ports to fluid flow, and thereby serving as valves. Rotors and stators used in conventional rotary valve technology relating to swing adsorption equipment typically comprise a plurality of circular ports located around the port pitch circle of the rotor and stator. Further, multiple adsorbent beds in a single vessel are associated by a single rotor/stator pair and the rotor and stator are operated at different speeds of rotation. Such conventional systems are constrained because each port is dedicated to a separate adsorbent bed. A consequence of this is that adsorbent beds have to be rotated which further limits the flow rates that can be effectively processed because of bed weight/balance considerations. Exemplary rotary valve assemblies for use in swing adsorption processes can be found in U.S. Pat. Nos. 6,311,719 and 7,819,948 and U.S. Patent Application Nos. 2010/0059701 and 2010/0089241.

In another aspect, the present invention relates to compact configurations for swing adsorption equipment suitable for use at remote locations where space is at a premium. For example, there is a great need for compact equipment designs for equipment used on off-shore platforms. Any swing adsorption equipment used off-shore should fit within a defined compact space allotted to it on the platform. The only conventional swing adsorption systems that can presently be used off-shore are systems containing only a few relatively small adsorbent beds capable of processing only a relatively small volume of feed gas. Consequently, large volumes of gases to be separated typically cannot be performed off-shore. The present invention allows for smaller swing adsorption equipment sizes, but without any appreciable sacrifice to performance capacity when compared to conventional swing adsorption equipment of comparable performance capacity. The present invention incorporates a compact design for multiple adsorbent beds that can be encased in a single vessel to form the adsorbent bed unit, each bed sharing a common actuator system with the other beds of the vessel. All vessel walls in the concentric arrangements are preferably of suitable thickness to withstand pressures in the range of 100 bar to 200 bar. The vessel walls are preferably multi-layered to facilitate drop-in or change-out of adsorbent beds, as well as for increasing durability for cyclic pressure swing conditions. These wall may be cylindrically shaped or other suitable geometric shapes. The vessels walls can also be suitably corrugated or stiffened in sections by any conventional means known in art.

In another aspect, the concentric adsorbent beds are arranged such that they have different face cross-sectional areas to receive a gaseous feed stream. The difference in cross-sectional area can be incorporated into gas separations processes so as to create a de facto taper affect, which as described above, can result in improved product gas purity.

Cyclic adsorption processes are generally practiced in one or more adsorption vessels comprised of one or more adsorbent-filled vessels. Two or more vessels are optionally arranged in parallel and operated out of phase such that at least one vessel is in the adsorption mode while at least one other vessel is in the adsorbent regeneration mode. In each cycle of the process a series of sequential steps, such as adsorption, equalization and regeneration, are carried out in each vessel. To enable the various streams to flow to and from the vessels, the feed, product, and exhaust lines are typically provided with a rotary valve assembly that provides valving action to permit gas flow through these lines at the appropriate time in the adsorption cycle. The rotary valve assembly also permits communication between the inlet and outlet assembly/vessels to permit flow between the vessels during pressure equalization steps. Pressure equalization is the passage of gas from a first vessel that has just completed its adsorption step to a vented or evacuated vessel which has completed its adsorbent regeneration step.

Any suitable adsorption bed that can be used for the separation of a target gas form a gaseous mixture can be used with the rotary valve system of present invention. The adsorbent is usually comprised of an adsorbent material supported on a non-adsorbent support, or contactor. Non-limiting examples of the form of the adsorbent bed of the present invention include beds of beaded or pelletized adsorbent particles or an adsorbent material on a structured contactor, such as a parallel channel contactor. Such contactors contain substantially parallel flow channels wherein 20 volume percent, preferably 15 volume percent or less of the open pore volume of the contactor, excluding the flow channels, is in pores greater than about 20 angstroms and less than 1 micron (e.g., mesopores and macropores). A flow channel is taken to be that portion of the contactor in which gas flows, if a steady state pressure difference is applied between the point or place at which a feed stream enters the contactor and the point or place at which a product stream leaves the contactor. In a parallel channel contactor, the adsorbent is incorporated into the wall of the flow channel. Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. "Parallel channel contactors" are defined as a subset of adsorbent contactors comprising structured (engineered) adsorbents in which substantially parallel flow channels are incorporated into the adsorbent structure. Parallel flow channels are described in detail in United States Patent Publication Nos. 2008/0282892 and 2008/0282886, both of which herein incorporated by reference in their entirety. These flow channels may be formed by a variety of means and in addition to the adsorbent material, the adsorbent structure may contain items such as, but not limited to, support materials, heat sink materials, void reduction components, and heating/cooling passages.

Non-limiting examples of adsorbent materials that can be used with the rotary valve assembly of the present invention include high surface area (>10 $m^2$/gm and preferably >75 $m^2$/gm) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

Figure 1:
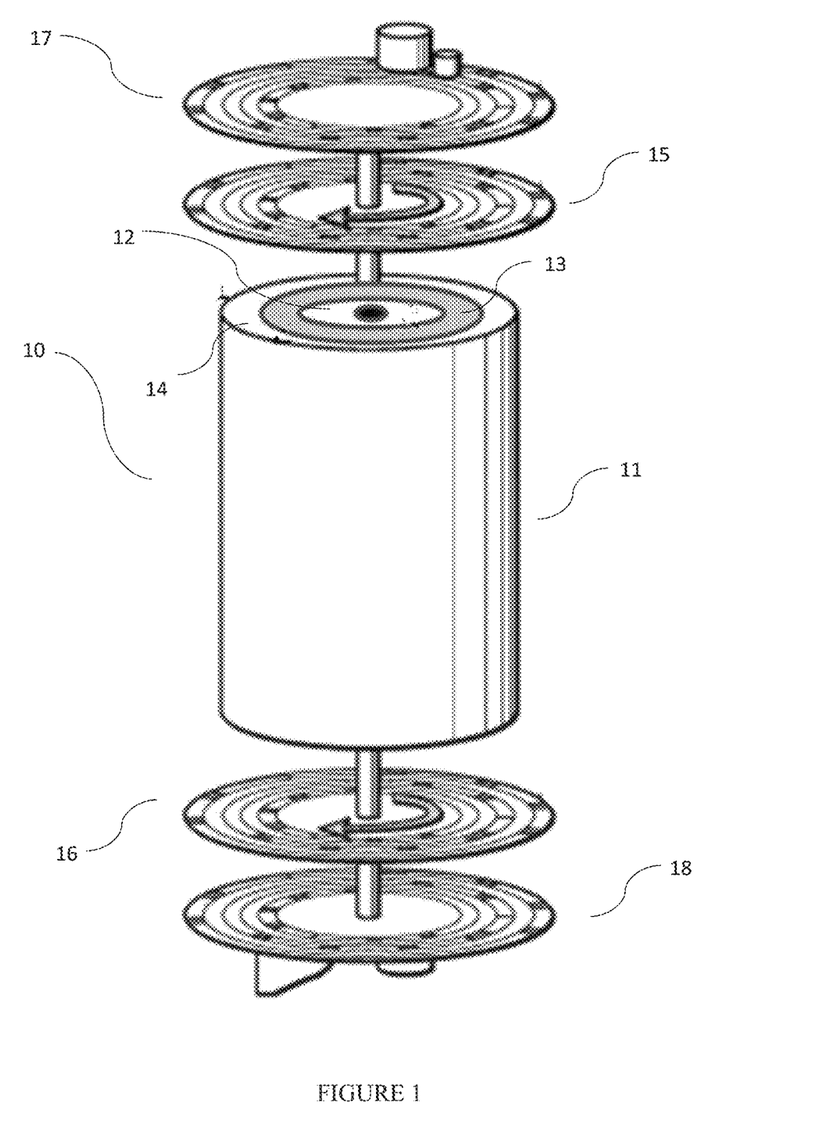
FIG. 1 illustrates an exemplary rotary valve and three concentric adsorbent bed system disclosed herein.

The present invention can be better understood with reference to the figures. FIG. 1 shows an exploded view of adsorption system 10. Adsorption system comprises an adsorbent vessel 11 containing three concentric adsorbent beds: innermost adsorbent bed 12 disposed about the vertical axis of adsorbent vessel 11, adsorbent bed 13 disposed about bed 12, and adsorbent bed 14 disposed about bed 13. Adsorbent beds 12, 13, and 14 all have different face cross-sectional area. Face cross-sectional area is defined as the cross-sectional area of the adsorbent bed in a plane perpendicular to feed/purge flow. In certain embodiments, bed 12 has a greater face cross-sectional area than bed 13, which in turn has a greater face cross-sectional area than bed 14. In other embodiments, bed 14 has a greater face cross-sectional area than bed 13, which in turn has a greater face cross-sectional area than bed 12. It would be understood by a person of skill in the art that many different combinations of face cross-sectional areas are possible in the present disclosure and it does not particularly matter which bed as a greater face cross-sectional area than any other bed, but rather that a bed has the greatest face cross-sectional area, another bed as the least face cross-sectional area, and another bed has a face cross-sectional area between the greatest and the least face cross-sectional area. Adsorbent beds 12, 13, and 14 may be separated by a material that is non-permeable to the gas flowing through the adsorbent beds to prevent leakage to other adsorbent beds and to contain pressure within the respective beds. As noted above, this configuration of a three bed system is a non-limiting one and described here for purposes of clarity.

Figure 2:
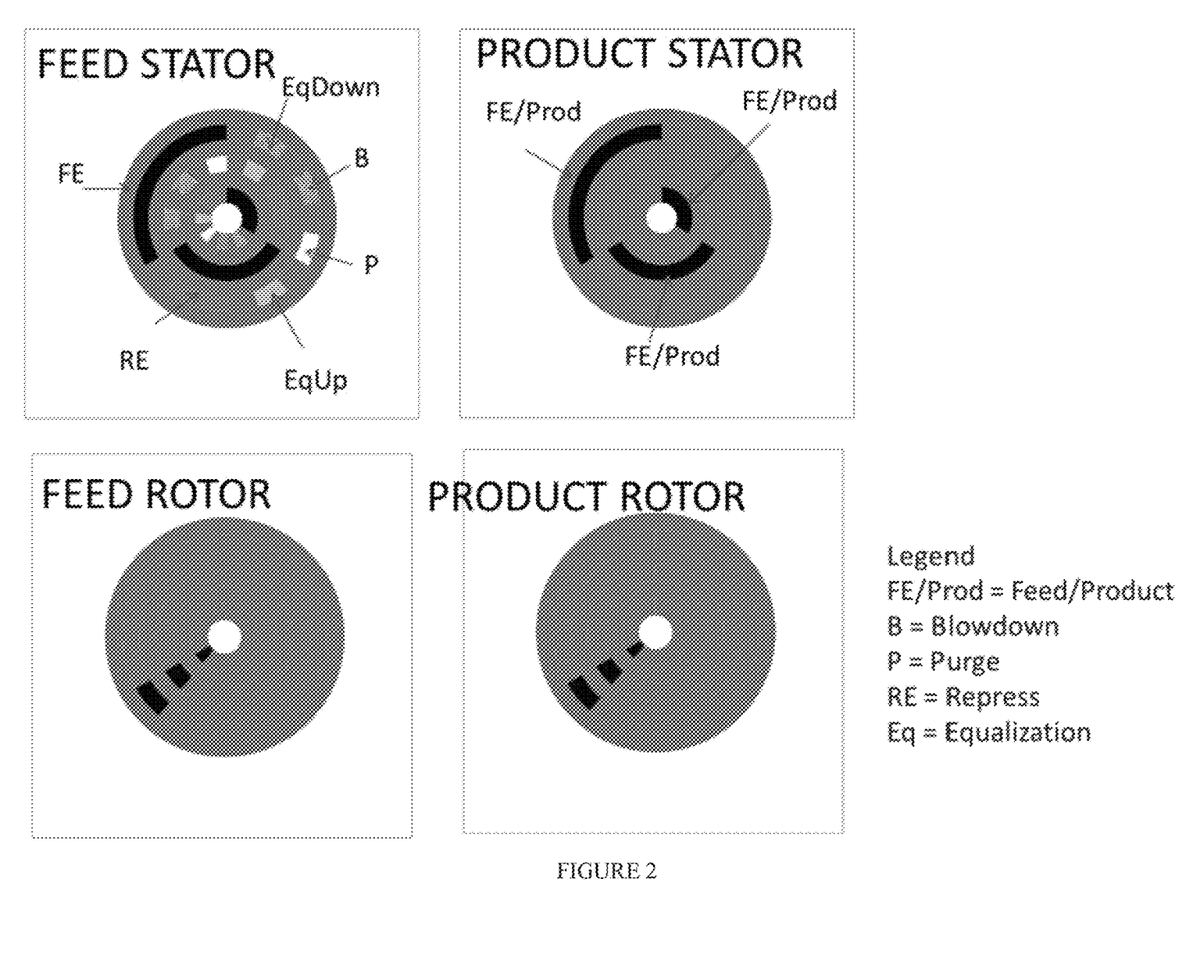
FIG. 2 illustrates a plan view of the feed and product stators and feed and product rotors according to an embodiment of the systems and processes disclosed herein.

Feed stator 18 and feed rotor 16 are at one end of adsorbent vessel 11 and product rotor 15 and product stator 17 are at the other end. One skilled in the art will recognize that a seal interface may be deployed between any two relatively moving surfaces. Thus, a seal may be provided between feed stator 18 and feed rotor 16, between feed rotor 16 and adsorbent vessel 11, between product rotor 15 and adsorbent vessel 11, and/or between product rotor 15 and product stator 17. Gas entering the bed or issuing from the bed passes through various apertures provided in the bounded rotors and stators. An exemplary plan view of said apertures is illustrated in FIG. 2. As shown there, feed stator 18 (upper left in FIG. 2) includes apertures in three concentric tracks corresponding to adsorbent beds 12, 13, and 14. Each track includes feed, repressurization, equalization, purge, and blowdown apertures. Feed rotor 16 rotates and contains three apertures in three concentric tracks corresponding to adsorbent beds 12, 13, and 14. As can be seen in FIG. 2, when a certain bed is undergoing its feed cycle, the other beds undergo equalization, blowdown, purge, hold, and repressurization cycles based on how the feed stator and feed rotor apertures align. In accordance with the present disclosure, adsorbent vessel 11 does not rotate, only the rotors rotate, unlike some conventional rotary valve systems associated with conventional swing adsorption processes wherein the adsorbent bed and rotors rotate. Product rotor 15 rotates and permits a product gas effluent or countercurrent blowdown or purge gas through its apertures when said apertures align with the apertures in product stator 17.

Figure 3:
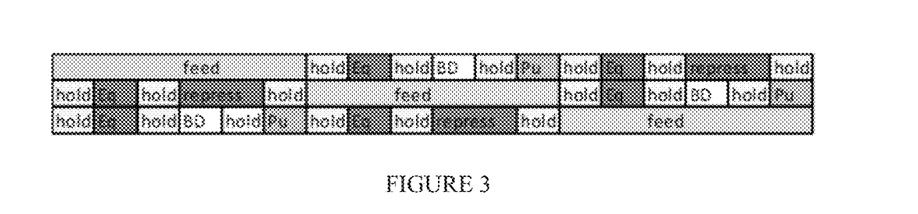
FIG. 3 illustrates an exemplary three adsorbent bed cycle according to the processes disclosed herein.

An example gas separation process utilizing adsorption system 10 is described in FIG. 3. For purposes of illustration, let us assume that the top row corresponds to bed 12, the middle row to bed 13, the bottom row to bed 14. Feed rotor 16 rotates at such a speed that a feed cycle for any one adsorbent bed last for time interval 6*t*, where t can be any increment of time. As illustrated, bed 12 begins in the feed cycle, wherein a feedstream comprising a target gas and a product gas is admitted to adsorbent bed 12. The target gas is adsorbed onto the adsorbent bed 12, and a product stream comprising a lower concentration of target gas and a higher concentration of product gas can be directed to adsorbent bed 13, 14 or some other downstream plant component. During this feed cycle, beds 13 and 14 undergo a hold (where no flow of gas or pressure change occurs) for time interval t. Bed 13 then increases its pressure via equalization with bed 14, which is coming off its feed cycle and is at high pressure, for time interval t. This allows for efficiencies in the system in that it allows bed 13 to partially repressurize prior to feeding and allows bed 14 to partially depressurize prior to desorbing the target gas that has been adsorbed during its feed cycle. Beds 13 and 14 then undergo another hold for time interval t. Bed 13 is then repressurized by being exposed to feedstream pressure for time interval 2*t* in preparation to receive a feed stream. While bed 13 is repressurized, bed 14 undergoes a blowdown to desorb the target gas from the adsorbent for time interval t, and then bed 14 is held for time interval t. During the final time interval t of bed 12's feed cycle, bed 13 undergoes a hold and bed 14 receives a purge gas to desorb and remaining target gas or other contaminants from the adsorbent.

Next, bed 13 begins its feed cycle, wherein a feedstream comprising a target gas and a product gas is admitted to adsorbent bed 13. The feedstream may be admitted from the outlet of bed 12 or another feedstream source. The target gas is adsorbed onto the adsorbent bed 13, and a product stream comprising a lower concentration of target gas and a higher concentration of product gas can be directed to adsorbent bed 14 or some other downstream plant component. During this feed cycle, beds 12 and 14 undergo a hold (where no flow of gas or pressure change occurs) for time interval t. Bed 14 then increases its pressure via equalization with bed 12, which is coming off its feed cycle and is at high pressure, for time interval t. This allows for efficiencies in the system in that it allows bed 14 to partially repressurize prior to feeding and allows bed 12 to partially depressurize prior to desorbing the target gas that has been adsorbed during its feed cycle. Beds 12 and 14 then undergo another hold for time interval t. Bed 14 is then repressurized by being exposed to feedstream pressure for time interval 2*t* in preparation to receive a feed stream. While bed 14 is repressurized, bed 12 undergoes a blowdown to desorb the target gas from the adsorbent for time interval t, and then bed 12 is held for time interval t. During the final time interval t of bed 13's feed cycle, bed 14 undergoes a hold and bed 12 receives a purge gas to desorb and remaining target gas or other contaminants from the adsorbent.

Finally, bed 14 begins its feed cycle, wherein a feedstream comprising a target gas and a product gas is admitted to adsorbent bed 14. The feedstream may be admitted from the outlet of bed 13 or another feedstream source. The target gas is adsorbed onto the adsorbent bed 14, and a product stream comprising a lower concentration of target gas and a higher concentration of product gas can be directed to some other downstream plant component. During this feed cycle, beds 12 and 13 undergo a hold (where no flow of gas or pressure change occurs) for time interval t. Bed 12 then increases its pressure via equalization with bed 13, which is coming off its feed cycle and is at high pressure, for time interval t. This allows for efficiencies in the system in that it allows bed 12 to partially repressurize prior to feeding and allows bed 13 to partially depressurize prior to desorbing the target gas that has been adsorbed during its feed cycle. Beds 12 and 13 then undergo another hold for time interval t. Bed 12 is then repressurized by being exposed to feedstream pressure for time interval 2*t* in preparation to receive a feed stream. While bed 12 is repressurized, bed 13 undergoes a blowdown to desorb the target gas from the adsorbent for time interval t, and then bed 13 is held for time interval t. During the final time interval t of bed 14's feed cycle, bed 12 undergoes a hold and bed 13 receives a purge gas to desorb and remaining target gas or other contaminants from the adsorbent.

In a preferred embodiment, the swing adsorption process using the stator/rotor assembly of the present invention is rapidly cycled, in which case the processes are referred to as rapid cycle pressure swing adsorption (RCPSA), rapid cycle temperature swing adsorption (RCTSA), and rapid cycle partial pressure swing or displacement purge adsorption (RCPPSA). For RCPSA the total cycle times are typically less than 90 seconds, preferably less than 30 seconds, more preferably less than 15 seconds, and even more preferably less than 10 seconds. For RCTSA the total cycle times are typically less than 600 seconds, preferably less than 200 seconds, more preferably less than 100 seconds, and even more preferably less than 60 seconds. Conventional PSA cycle times are typically in excess of 2 to 4 minutes.

Figure 4:
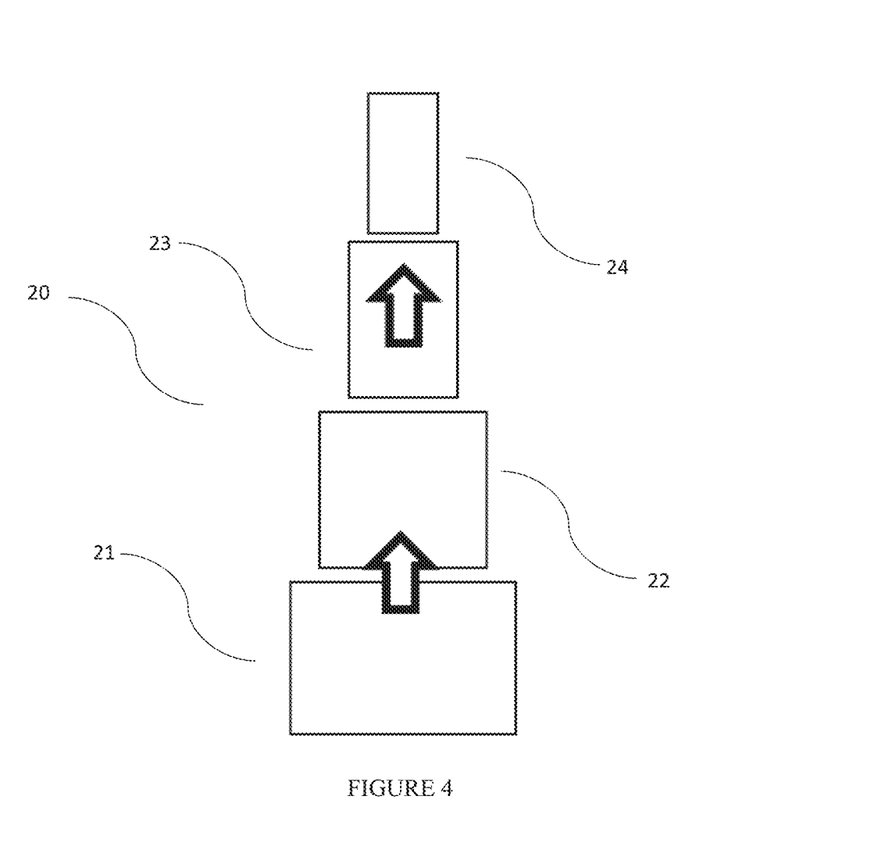
FIG. 4 illustrates a simplified view of the tapered adsorbent bed scheme disclosed herein.

In a preferred embodiment, the feedstream is passed in sequentially from the bed of greatest face cross-sectional area to the bed of lowest face cross-sectional area. In the example described above with respect to FIG. 3, bed 12 may have the greatest face cross-sectional area, bed 13 has a lower face cross-sectional area than bed 12, and bed 14 has a lower face cross-sectional area than bed 13. This creates a de facto taper effect that is illustrated in FIG. 4. FIG. 4 depicts a four bed adsorption system 20 according to the present disclosure wherein the feedstream contacts bed 21 of greatest face cross-sectional area first and then sequentially enters beds 22, 23, and 24 of decreasing face cross-sectional area. The taper helps to produce a product gas having a high purity as described above.

Figure 5A:
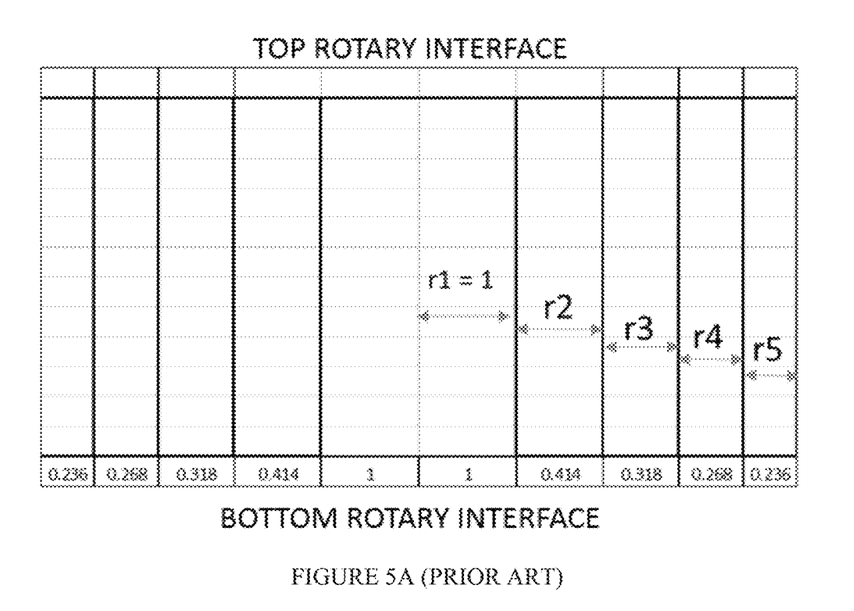
FIG. 5A illustrates cross-sectional view of a concentric adsorbent bed of the prior art.

In an alternative embodiment, the volume of adsorbent material in each bed is kept substantially equal. FIG. 5A depicts a cross sectional view of a prior art concentric bed arrangement having equal face cross-sectional areas between beds. The thickness of each bed reduces with each successive ring to maintain an equal volume of adsorbent material in each bed. Having an equal volume of adsorbent can be advantageous in a repetitive cycle because then each bed can be treated as identical. In reality, however, the narrowing concentric beds depicted in FIG. 5A can have an adverse effect on bed performance. Specifically, fluid maldistribution across the face of the bed can become exacerbated in the outer, narrower beds.

Figure 5B:
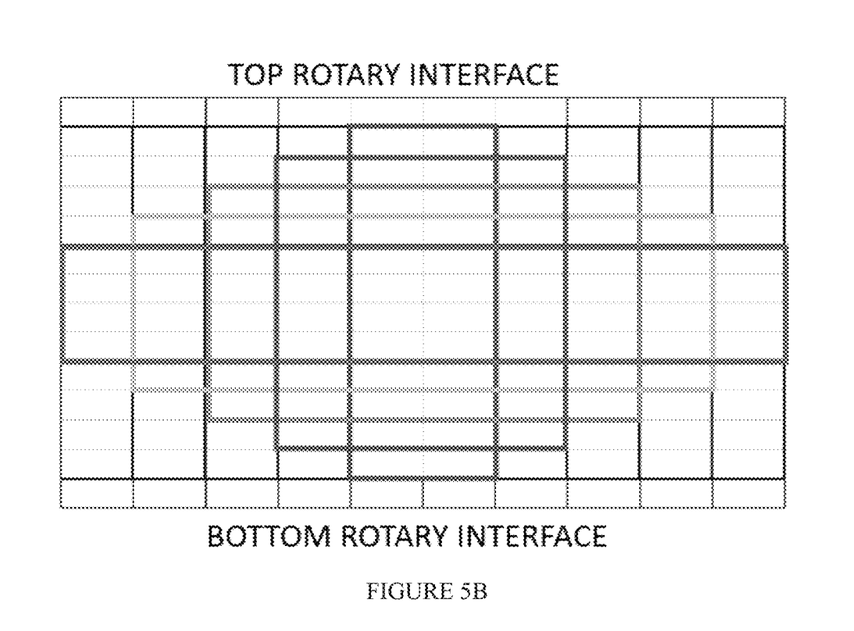
FIG. 5B illustrates a cross-sectional view of a particular embodiment in which concentric adsorbent beds have equal thicknesses and adsorbent material stacked to different so as to maintain an equal volume of adsorbent material between beds.
Figure 5C:
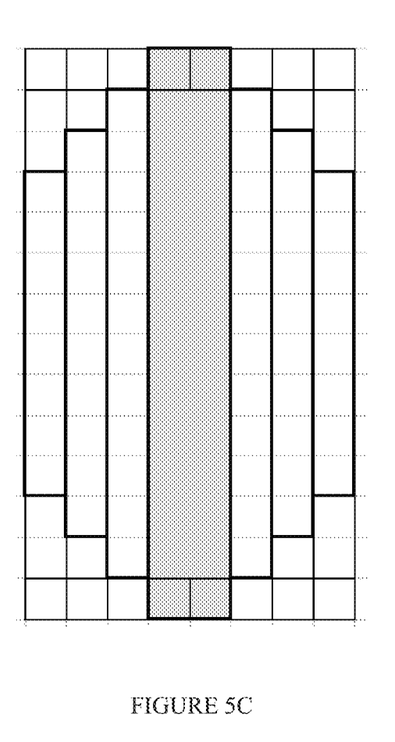
FIG. 5C illustrates a cross-sectional view of a particular embodiment in which concentric adsorbent beds have equal thicknesses and adsorbent material stacked to different so as to maintain an equal volume of adsorbent material between beds, wherein the inner shaded region does not contain adsorbent material.

FIGS. 5B and 5C offer a solution to above problem present in the prior art while still maintaining an equal volume of adsorbent material in each bed. As shown in FIG. 5B, the thicknesses of each of the concentric beds is kept equal. To keep the same volume of adsorbent material the height of adsorbent material is altered from bed to bed. In order to determine the height of adsorbent needed, one only need to start with the desired volume and the divide by the face cross-sectional area of the bed (Height=(Desired Volume)/Area). The face cross-sectional area of the bed is calculated subtracting the square of the inner radius ($r_i$) from the square of the outer radius ($r_o$) and multiplying by $\pi$ (Area=$\pi(r_o^2-r_i^2)$). FIG. 5C depicts a bed with slightly narrower thickness and an inner shaded region that does not contain any adsorbent material. This permits height differences between the beds that are less exaggerated than those shown in FIG. 5B. Moreover, the inner region of FIG. 5C could permit the adsorbent bed configuration to be disposed about a shaft for rotating bed arrangements. That is, the rotary valve system depicted in FIG. 1 could become a stationary valve system and the bed could rotate to produce the same effect.

Figure 6:
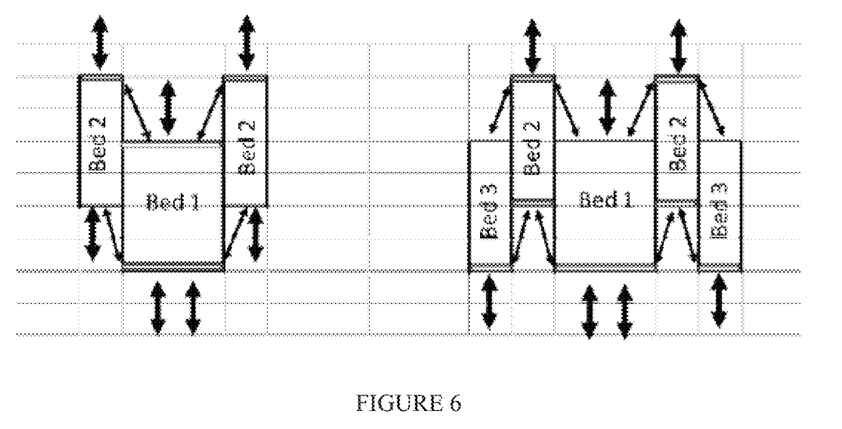
FIG. 6 illustrates a cross-sectional view of a particular embodiment in which the concentric adsorbent beds are offset from one another.

Additionally and/or alternatively to the embodiments described above, FIG. 6 shows a further advantageous novel compact arrangement of staggered or offset concentric adsorbent beds. When the concentric adsorbent beds are offset from one another it permits more efficient interconnections between the beds, i.e. fewer bends in piping. This improves space usage above and between the beds to better accommodate piping, flanging, poppet valving, etc. Packing the beds to different heights as described above and shown in FIGS. 5B and 5C results in a defacto offsetting of the beds and can provided the same benefits.

Additionally and/or alternatively, the concentric bed processes and apparatus described above can be utilized in adsorbed gas storage for power generation processes such as on-board vehicle applications, specifically using adsorbed natural gas as on-board fuel. In a preferred embodiment, a target gas, such as methane, is adsorbed into an onboard vessel that contains the adsorbent bed system described above. The adsorbent bed(s) in the system would include an adsorbent selective for methane. Methane could be filled/charged to the system and adsorbed onto the adsorbent bed(s). Such adsorption is an exothermic process and as temperature rises, the effective capacity of the adsorbent decreases. In one embodiment, the storage system described above can comprise two adsorbent beds. As one bed is filled/charged, the other is depressurized to desorb the target gas, which is a cooling process. The cooler desorbed target gas can be sent to the bed being charged/filled so as to reduce the temperature of the bed and increase the effective capacity of the charging bed. Once the target gas is fully adsorbed onto the adsorbent bed, it can be desorbed by depressurization. At least a portion of the desorbed target gas can be sent to a power generation assembly, such as an automobile engine.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

In view of the many possible embodiments to which the principles of the disclosed invention may be applied, it should be recognized that the illustrative embodiments are only preferred examples of the invention and should not be taken as limiting the scope of the invention.

Additional Embodiments

Embodiment 1. An adsorbent bed system for use in swing adsorption processes comprising: a rotary valve assembly comprising a feed stator having at least two annular tracks, each of the annular tracks having at least one opening to permit gas to flow there through; a feed rotor being connected to the feed stator, the feed rotor having at least two annular tracks, each of the annular tracks having an opening to permit gas to flow there through; product rotor having at least two annular tracks, each of the annular tracks having an opening to permit gas to flow there through; and a product stator having at least two annular tracks, each of the annular tracks having an opening to permit gas to flow there through; a first adsorbent bed of material capable of selectively removing a target gas from a gaseous mixture, which adsorbent bed is substantially cylindrical shape; and a second adsorbent bed of material capable of selectively removing a target gas from a gaseous mixture, which second adsorbent bed has a substantially cylindrical shape and being disposed about the first adsorbent bed of material and has a different face cross-sectional area than the face cross-sectional area of the first adsorbent bed; the first and second adsorbent beds being in fluid communication with the feed rotor, product rotor, and each other.

Embodiment 2. The adsorbent bed system of embodiment 1, further comprising: a third adsorbent bed of material capable of selectively removing a target gas from a gaseous mixture and being substantially annular in shape and being disposed about the second adsorbent bed, the third adsorbent bed having a different face cross-sectional area than the face cross-sectional area of the first and second adsorbent beds; wherein the feed stator and feed rotor have at least three annular tracks, each of the annular tracks having an opening to permit gas flow through; and wherein the product rotor and product stator have at least three annular tracks, each of the annular tracks having an opening to permit gas flow through.

Embodiment 3. The adsorbent bed system of embodiment 2, further comprising: a fourth adsorbent bed of material capable of selectively removing a target gas from a gaseous mixture and being substantially annular in shape and being disposed about the third adsorbent bed, the fourth adsorbent bed having a different face cross-sectional area than the face cross-sectional area of the first, second and third adsorbent beds; wherein the feed stator and feed rotor have at least four annular tracks, each of the annular tracks having an opening to permit gas flow through; and wherein the product rotor and product stator have at least four annular tracks, each of the annular tracks having an opening to permit gas flow through.

Embodiment 4. The adsorbent bed system of embodiments 2 or 3, wherein the gaseous mixture flows through the feed stator, through the feed rotor, into the first adsorbent bed, then into the second adsorbent bed, then into the third adsorbent bed, through the product rotor, and through the product stator, wherein flow through the first, second, and third adsorbent bed is in the axial plane, wherein flow through the second adsorbent bed is in the opposite direction from the first adsorbent bed and the third adsorbent bed, wherein the face cross-sectional area of the first adsorbent bed is greater than the second adsorbent bed, wherein the face cross-sectional area of the second adsorbent bed is greater than the third adsorbent bed.

Embodiment 5. The adsorbent bed system of embodiments 2 or 3, wherein the gaseous mixture flows through the feed stator, through the feed rotor, into the third adsorbent bed, then into the second adsorbent bed, then into the first adsorbent bed, through the product rotor, and through the product stator, wherein flow through the first, second, and third adsorbent bed is in the axial plane, wherein flow through the second adsorbent bed is in the opposite direction from the first adsorbent bed and the third adsorbent bed, wherein the face cross-sectional area of the third adsorbent bed is greater than the second adsorbent bed, wherein the face cross-sectional area of the second adsorbent bed is greater than the first adsorbent bed.

Embodiment 6. The adsorbent bed system of any of embodiments 2-5, wherein the feed stator includes three rings of annular tracks, each ring aligned with one of the first, second, and third adsorbent bed, each ring containing annular tracks for a feedstream, a blowdown stream, a purge stream, and pressure equalization with a neighboring adsorbent bed.

Embodiment 7. The adsorbent bed system of any of the previous embodiments, wherein there is an equal volume of adsorbent material in the first adsorbent bed and the second adsorbent bed.

Embodiment 8. The adsorbent bed system of any of the previous embodiments, wherein the adsorbent material in the first adsorbent bed and the adsorbent material in the second adsorbent bed is loaded to different heights.

Embodiment 9. The adsorbent bed system of any of the previous embodiments, wherein the first adsorbent bed is offset from the second adsorbent bed in the axial plane.

Embodiment 10. An adsorption process comprising: providing a feedstream containing a first concentration of a product gas and first concentration of a target gas; feeding the feedstream to the first adsorbent bed in the adsorption system described above; in the first adsorbent bed, adsorbing the target gas onto the material capable of selectively removing a target gas from a gaseous mixture; recovering a stream from the first adsorbent bed that has a higher concentration of product gas and a lower concentration of target gas than the feedstream; reducing the pressure in the first adsorbent bed by equalizing the first adsorbent bed with one of the second and third adsorbent beds; further reducing the pressure in the first adsorbent bed by outputting a blowdown stream from at least one end of the first adsorbent bed; purging the first adsorbent bed with a purge gas to produce a target gas recovery stream that as higher concentration of target gas and a lower concentration of product gas than the feedstream.

Embodiment 11. The adsorption process of embodiment 10, wherein during feeding of the first adsorbent bed, the second adsorbent bed equalizes with the third adsorbent bed and undergoes a repressurization step and the third adsorbent bed equalizes with the second adsorbent bed and undergoes a blowdown step and a purge step.

Embodiment 12. The adsorption process of embodiments 10 or 11, wherein the feedstream passes sequentially from the first adsorbent bed to the second adsorbent bed to the third adsorbent bed, wherein the first adsorbent bed has a greater face cross-sectional area than the second adsorbent bed, wherein the second adsorbent bed has a greater cross-sectional area than the third adsorbent bed.

Embodiment 13. The adsorption process of any of embodiments 10-12, wherein the product gas is $N_2$ and the target gas is $CO_2$.

Embodiment 14. The adsorption process of any of embodiments 10-12, wherein the product gas is $H_2$ and the target gas is $CO_2$.

Embodiment 15. The adsorption process of any of embodiments 10-13, wherein the feedstream comprises nitrogen and oxygen.

Embodiment 16. The adsorption process of any of embodiments 10-12, wherein the feedstream comprises olefins and paraffins.

Embodiment 17. The adsorption process of any of embodiments 10-12 or 16, wherein the feedstream comprises ethylene and ethane.

Embodiment 18. The adsorption process of any of embodiments 10-12 or 16, wherein the feedstream comprises propylene and propane.

Embodiment 19. The adsorption process of any of embodiments 10-12, wherein the feedstream comprises a mixture of xylenes.

Embodiment 20. An adsorption process for storage and use of a target gas, comprising: providing a feedstream consisting essentially of a target gas; feeding the feedstream to the first adsorbent bed in the adsorption system described above; adsorbing the target gas onto the material capable of selectively removing a target gas in the first adsorbent bed; discharging target gas previously adsorbed onto the material capable of selectively removing a target gas in the second adsorbent bed by depressurizing the second adsorbent bed; wherein a portion of the discharged target gas is fed into the first adsorbent concurrently with the feeding the feedstream to the first adsorbent bed; feeding the feedstream to the second adsorbent bed in the adsorption system described above; adsorbing the target gas onto the material capable of selectively removing a target gas in the second adsorbent bed; discharging target gas previously adsorbed onto the material capable of selectively removing a target gas in the first adsorbent bed by depressurizing the second adsorbent bed; wherein a portion of the discharged target gas is fed into the second adsorbent concurrently with the feeding the feedstream to the second adsorbent bed; and directing a portion of discharged target gas to a power generation assembly.

Embodiment 21. The adsorption process of embodiment 20, wherein the adsorption system is located on-board a vehicle and the power generation assembly provides propulsion power to the vehicle.

Embodiment 22. The adsorption process of any of embodiments 20-21, further comprising cooling the first adsorbent bed via depressurization of the second adsorbent bed and cooling the second adsorbent via depressurization of the first adsorbent bed.

Embodiment 23. The adsorption process of any of embodiments 20-22, wherein the target gas is methane.

Embodiment 24. The adsorption process of any of any of the previous embodiments, the materials capable of selectively removing a target gas are carbons, zeolites, metal-organic frameworks, or combinations thereof.

The invention claimed is:

1. An adsorbent bed system for use in swing adsorption processes comprising:
   a rotary valve assembly comprising
      a feed stator having at least two annular tracks, each of the annular tracks having at least one opening to permit gas to flow there through;
      a feed rotor being connected to the feed stator, the feed rotor having at least two annular tracks, each of the annular tracks having an opening to permit gas to flow there through;
      product rotor having at least two annular tracks, each of the annular tracks having an opening to permit gas to flow there through; and
      a product stator having at least two annular tracks, each of the annular tracks having an opening to permit gas to flow there through;
   a first adsorbent bed of material capable of selectively removing a target gas from a gaseous mixture, which adsorbent bed is substantially cylindrical shape; and
   a second adsorbent bed of material capable of selectively removing a target gas from a gaseous mixture, which second adsorbent bed has a substantially annular shape and being disposed about the first adsorbent bed of material and has a different face cross-sectional area than the face cross-sectional area of the first adsorbent bed; the first and second adsorbent beds being in fluid communication with the feed rotor, product rotor, and each other.

2. The adsorbent bed system of claim 1, further comprising:
   a third adsorbent bed of material capable of selectively removing a target gas from a gaseous mixture and being substantially annular in shape and being disposed about the second adsorbent bed, the third adsorbent bed having a different face cross-sectional area than the face cross-sectional area of the first and second adsorbent beds;
   wherein the feed stator and feed rotor have at least three annular tracks, each of the annular tracks having an opening to permit gas flow through; and
   wherein the product rotor and product stator have at least three annular tracks, each of the annular tracks having an opening to permit gas flow through.

3. The adsorbent bed system of claim 2, further comprising:
   a fourth adsorbent bed of material capable of selectively removing a target gas from a gaseous mixture and being substantially annular in shape and being disposed about the third adsorbent bed, the fourth adsorbent bed having a different face cross-sectional area than the face cross-sectional area of the first, second and third adsorbent beds;
   wherein the feed stator and feed rotor have at least four annular tracks, each of the annular tracks having an opening to permit gas flow through; and
   wherein the product rotor and product stator have at least four annular tracks, each of the annular tracks having an opening to permit gas flow through.

4. The adsorbent bed system of claim 2, wherein the gaseous mixture flows through the feed stator, through the feed rotor, into the first adsorbent bed, then into the second adsorbent bed, then into the third adsorbent bed, through the product rotor, and through the product stator, wherein flow through the first, second, and third adsorbent bed is in the axial plane, wherein flow through the second adsorbent bed is in the opposite direction from the first adsorbent bed and the third adsorbent bed, wherein the face cross-sectional area of the first adsorbent bed is greater than the second adsorbent bed, wherein the face cross-sectional area of the second adsorbent bed is greater than the third adsorbent bed.

5. The adsorbent bed system of claim 2, wherein the gaseous mixture flows through the feed stator, through the feed rotor, into the third adsorbent bed, then into the second adsorbent bed, then into the first adsorbent bed, through the product rotor, and through the product stator, wherein flow through the first, second, and third adsorbent bed is in the axial plane, wherein flow through the second adsorbent bed is in the opposite direction from the first adsorbent bed and the third adsorbent bed, wherein the face cross-sectional area of the third adsorbent bed is greater than the second adsorbent bed, wherein the face cross-sectional area of the second adsorbent bed is greater than the first adsorbent bed.

6. The adsorbent bed system of claim 2, wherein the feed stator includes three rings of annular tracks, each ring aligned with one of the first, second, and third adsorbent bed, each ring containing annular tracks for a feedstream, a blowdown stream, a purge stream, and pressure equalization with a neighboring adsorbent bed.

7. The adsorbent bed system of claim 1, wherein there is an equal volume of adsorbent material in the first adsorbent bed and the second adsorbent bed.

8. The adsorbent bed system of claim 1, wherein the adsorbent material in the first adsorbent bed and the adsorbent material in the second adsorbent bed is loaded to different heights.

9. The adsorbent bed system of claim 1, wherein the first adsorbent bed is offset from the second adsorbent bed in the axial plane.

10. An adsorption process comprising:
    providing a feedstream containing a first concentration of a product gas and first concentration of a target gas;
    feeding the feedstream to the first adsorbent bed in the adsorption system of claim 2;
    in the first adsorbent bed, adsorbing the target gas onto the material capable of selectively removing a target gas from a gaseous mixture;
    recovering a stream from the first adsorbent bed that has a higher concentration of product gas and a lower concentration of target gas than the feedstream;
    reducing the pressure in the first adsorbent bed by equalizing the first adsorbent bed with one of the second and third adsorbent beds;
    further reducing the pressure in the first adsorbent bed by outputting a blowdown stream from at least one end of the first adsorbent bed;
    purging the first adsorbent bed with a purge gas to produce a target gas recovery stream that as higher concentration of target gas and a lower concentration of product gas than the feedstream.

11. The adsorption process of claim 10, wherein during feeding of the first adsorbent bed, the second adsorbent bed equalizes with the third adsorbent bed and undergoes a repressurization step and the third adsorbent bed equalizes with the second adsorbent bed and undergoes a blowdown step and a purge step.

12. The adsorption process of claim 11, wherein the feedstream passes sequentially from the first adsorbent bed to the second adsorbent bed to the third adsorbent bed, wherein the first adsorbent bed has a greater face cross-sectional area than the second adsorbent bed, wherein the second adsorbent bed has a greater cross-sectional area than the third adsorbent bed.

13. The adsorption process of claim 10, wherein the product gas is $N_2$ and the target gas is $CO_2$.

14. The adsorption process of claim 10, wherein the product gas is $H_2$ and the target gas is $CO_2$.

15. The adsorption process of claim 10, wherein the feedstream comprises nitrogen and oxygen.

16. The adsorption process of claim 10, wherein the feedstream comprises olefins and paraffins.

17. The adsorption process of claim 16, wherein the feedstream comprises ethylene and ethane.

18. The adsorption process of claim 16, wherein the feedstream comprises propylene and propane.

19. The adsorption process of claim 10, wherein the feedstream comprises a mixture of xylenes.

20. An adsorption process for storage and use of a target gas, comprising:
    providing a feedstream consisting essentially of a target gas;
    feeding the feedstream to the first adsorbent bed in the adsorption system of claim 1;
    adsorbing the target gas onto the material capable of selectively removing a target gas in the first adsorbent bed;
    discharging target gas previously adsorbed onto the material capable of selectively removing a target gas in the second adsorbent bed by depressurizing the second adsorbent bed;
    wherein a portion of the discharged target gas is fed into the first adsorbent concurrently with the feeding the feedstream to the first adsorbent bed;
    feeding the feedstream to the second adsorbent bed in the adsorption system of claim 1;
    adsorbing the target gas onto the material capable of selectively removing a target gas in the second adsorbent bed;
    discharging target gas previously adsorbed onto the material capable of selectively removing a target gas in the first adsorbent bed by depressurizing the second adsorbent bed;
    wherein a portion of the discharged target gas is fed into the second adsorbent concurrently with the feeding the feedstream to the second adsorbent bed; and
    directing a portion of discharged target gas to a power generation assembly.

21. The adsorption process of claim 20, wherein the adsorption system of claim 1 is located on-board a vehicle and the power generation assembly provides propulsion power to the vehicle.

22. The adsorption process of claim 20, further comprising cooling the first adsorbent bed via depressurization of the second adsorbent bed and cooling the second adsorbent via depressurization of the first adsorbent bed.

23. The adsorption process of claim 20, wherein the target gas is methane.

24. The adsorption process of claim 20, the materials capable of selectively removing a target gas are carbons, zeolites, metal-organic frameworks, or combinations thereof.

* * * * *